United States Patent [19]

Ohmi et al.

[11] Patent Number: 4,702,203
[45] Date of Patent: Oct. 27, 1987

[54] INTAKE MEANS OF INTERNAL COMBUSTION ENGINE

[75] Inventors: Masatoshi Ohmi, Iwata; Toshihiko Yoneda, Shizuoka; Kazuo Uchiyama, Hamamatsu, all of Japan

[73] Assignee: Yamaha Hatsudoki Kabushiki Kaisha, Iwata, Japan

[21] Appl. No.: 914,936

[22] Filed: Oct. 3, 1986

Related U.S. Application Data

[62] Division of Ser. No. 634,795, Jul. 26, 1984, Pat. No. 4,649,876.

[30] Foreign Application Priority Data

Oct. 12, 1983 [JP] Japan .................. 58-190253

[51] Int. Cl.$^4$ ............................................. F02B 75/18
[52] U.S. Cl. ............................. 123/52 MV; 123/302; 123/432
[58] Field of Search ........ 123/52 MC, 52 MV, 52 M, 123/295, 302, 55 VF, 55 VS, 55 VE, 308, 432, 52 MB

[56] References Cited

U.S. PATENT DOCUMENTS

| | | | |
|---|---|---|---|
| 2,845,911 | 8/1958 | Gill | 123/52 MV |
| 2,845,912 | 8/1958 | Bird | 123/52 MV |
| 2,909,165 | 10/1959 | Dolza | 123/52 MV |
| 2,916,027 | 12/1959 | Chayne et al. | 123/52 MV |
| 2,927,564 | 3/1960 | Turlay et al. | 123/52 MV |
| 4,318,371 | 3/1982 | McFarland | 123/52 M |
| 4,577,596 | 3/1986 | Senga | 123/52 MV |

FOREIGN PATENT DOCUMENTS

| | | | |
|---|---|---|---|
| 1235065 | 2/1967 | Fed. Rep. of Germany | 123/52 M |
| 0110765 | 7/1982 | Japan | 123/52 M |
| 0043923 | 3/1984 | Japan | 123/52 M |
| 0756062 | 8/1980 | U.S.S.R. | 123/52 M |

Primary Examiner—Craig R. Feinberg
Assistant Examiner—David A. Okonsky
Attorney, Agent, or Firm—Ernest A. Beutler

[57] ABSTRACT

An improved induction system for a V type engine that is tuned for substantially all running conditions and which is nevertheless compact in construction. The system includes a pair of air boxes each disposed adjacent one of the cylinder heads of the engine. Each cylinder head has at least two intake passages serving the respective cylinder bores and a first conduit extends from the adjacent air box to one of the intake passages and a second conduit extends from the other of the air boxes to the other intake passage. A throttle valve arrangement is also incorporated so that good performance is achieved under all running conditions.

10 Claims, 4 Drawing Figures

INTAKE MEANS OF INTERNAL COMBUSTION ENGINE

This is a division of U.S. patent application Ser. No. 634,795, filed July 26, 1984 and now U.S. Pat. No. 4,649,876.

BACKGROUND OF THE INVENTION

Ths invention relates to an intake means for an internal combustion engine and more particularly to an improved induction system, particularly adapted for use with V type engines.

As is well known, the induction system for an internal combustion engine, particularly for automotive application, must be a compromise if conventional induction systems employing only a single intake passage for each cylinder are employed. That is, a conventional induction system must be tuned to give either optimum performance at low speeds or maximum power. With conventional systems, it is impossible to obtain both good low speed running and maximum power output. For that reason, most automotive engines enbodying conventional induction systems represent a compromise in induction system tuning and design.

Recently it has been proposed to employ a so-called dual type of induction system wherein two or more induction passages serve the same chamber of the engine and which incorporates a throttle valve arrangement so that one induction passage serves primarily the low speed and mid-range running conditions while both induction passages are employed to achieve maximum power output. An example of such an induction system is shown in Application for U.S. patent Ser. No. 597,815, filed Apr. 9, 1984, which is a continuation of application Ser. No. 332,825, filed Dec. 21, 1981, entitled "Intake System For Multi-Intake Valve Type Engine and assigned to the same assignee of this application.

Although induction systems of this type can be employed for achieving good running under a wide range of running conditions, they are obviously more complicated than the conventional systems that employ only a single induction passage for each chamber. In addition to the aforenoted advantages, the use of two induction passages for each chamber of the engine permits each induction passage to be tuned so as to be more suitably perform under the respective running condition which it serves. An example of such a tuning arrangement is disclosed in Application for U.S. patent Ser. No. 586,886, filed Mar. 9, 1984, which is a continuation of application Ser. No. 333,940, filed Dec. 23, 1981, entitled "Intake System for Multiple Intake Valve Type Engines and assigned to the same assignee of this application.

Although induction systems of the type described obviously offer considerable advantages over conventional induction systems, they are particularly difficult to adapt to engines having non-aligned cylinders, such as engines of the V or opposed type. With engines of this type, particularly those embodying narrow V angles, it is difficult to position all of the necessary induction conduit within the V of the engine and also to achieve the aforenoted tuning effects.

It is, therefore, a principal object of this invention to provide an improved induction system for an internal combustion engine.

It is a further object of this invention to provide an improved induction system for an engine having non-aligned cylinders.

It is a further object of this invention to provide an improved induction system for an engine of the V type and which employs two intake passages for each cylinder and in which the intake passages are tuned separately from each other.

SUMMARY OF THE INVENTION

A first feature of the invention is adapted to be embodied in an induction system for an internal combustion engine comprising a first bank of cylinders, a second bank of cylinders disposed at an angle to the first bank of cylinders and first and second air boxes juxtaposed to the respective cylinder banks. Means admit air to the air boxes and first conduit means extend from each of the air boxes to intake passage means of the juxtaposed cylinder bank. Second conduit means extend from each of the air boxes to intake passage means of the other of the cylinder bank.

Another feature of the invention is adapted to be embodied in an internal combustion engine having first and second cylinder bores closed by first and second cylinder heads and which are disposed at an angle to each other. Each of the cylinder heads has first and second intake passages serving the respective cylinder bore. A first air box is juxtaposed to the first cylinder head and a second air box is juxtaposed to the second cylinder head. A respective first intake conduit extends from each of the air boxes to the first intake passages of the juxtaposed cylinder head. A respective second intake conduit extends from each of the air boxes to the second intake passage of the other cylinder head.

Another feature of the invention is also adapted to be embodied in an induction system for an internal combustion engine having first and second cylinder bores closed by first and second cylinder heads and disposed to an angle to each other. Each of the cylinder heads has first and second intake passages that serve the respective cylinder bore. First and second air boxes are juxtaposed respectively to the first and second cylinder heads. In accordance with this feature of the invention, conduit means interconnect each of the air boxes to respective of the intake passages for delivering a charge from the air boxes to the cylinder bores. First throttle valve means control the flow to the cylinder bores only through the second intake passages and second throttle valve means control the flow to the cylinder bores through both of the intake passages.

DETAILED DESCRIPTION OF THE PREFERRED EMBODIMENT

Figure 1:
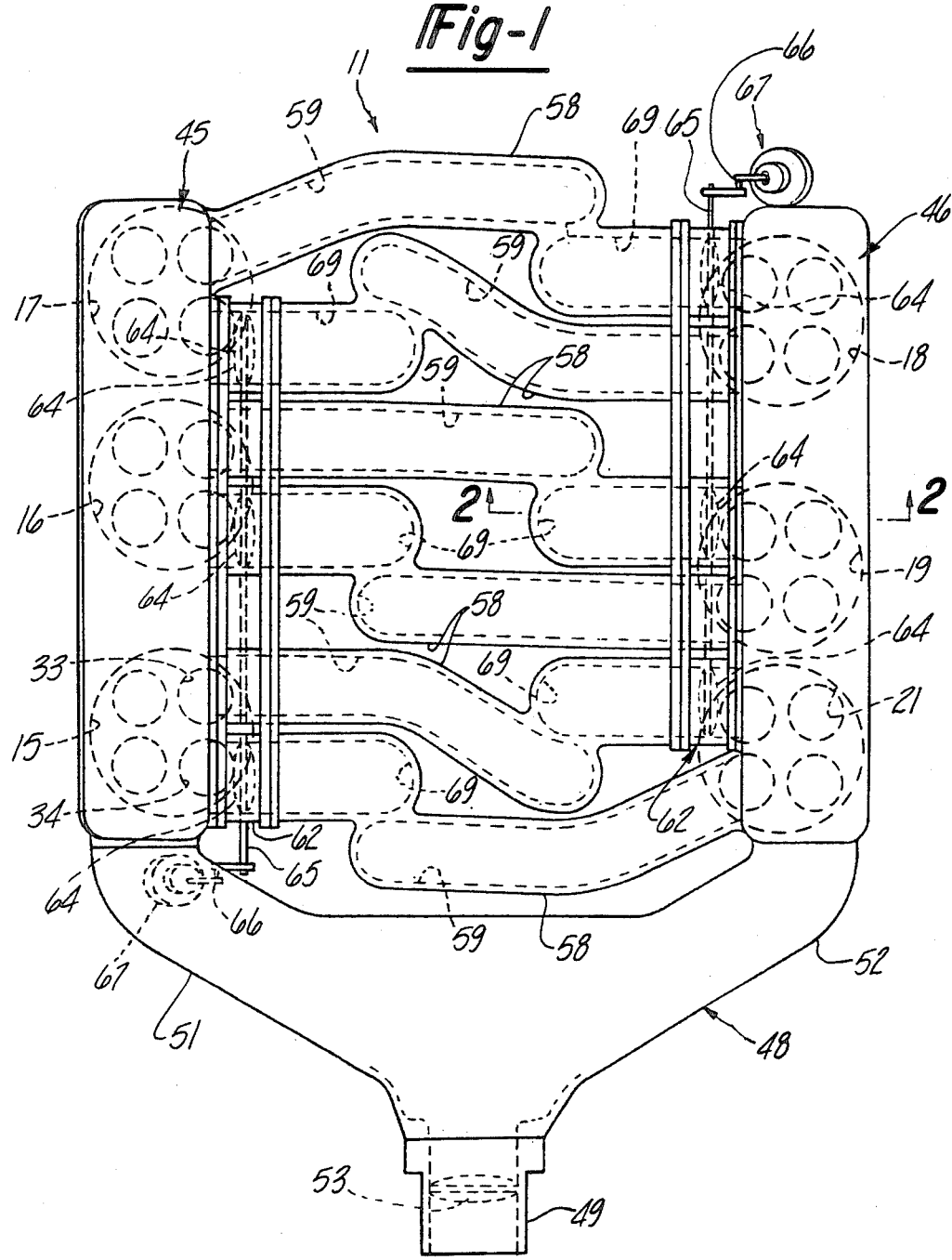
FIG. 1 is a top plan view of an internal combustion engine constructed in accordance with an embodiment of the invention.

In the drawings, the reference numeral 11 indicates generally an internal combustion engine constructed in accordance with an embodiment of the invention. In the illustrated embodiment, the engine 11 is of the "V" type and includes a cylinder block 12 having angularly inclined banks 13 and 14. In the illustrated embodiment, the engine 11 is of the V6 type and each cylinder bank 13 and 14 defines three cylinder bores, as will be described. The cylinder bores of the bank 13 are disposed at an angle to those of the bank 14 and in the illustrated embodiment, this angle is 60°. It is to be understood, however, that the invention and certain facets of it are useful with engine of other configurations and engines in which the angle between the banks is other than 60°. The invention, however, has particular utility in conjunction with V type engines and particularly those in which a very narrow or relatively shallow cylinder bank angle is employed.

The cylinder bank 13 is provided with three cylinder bores, as has been noted, which cylinder bores are shown in broken line circles in FIG. 1 and are identified by the respective numerals 15, 16 and 17. In a like manner, the cylinder bank 14 is also formed with three cylinder bores which are shown in dotted line circles and which are identified by the reference numerals 18, 19 and 21. Pistons 22 (FIG. 2) are reciprocally supported in each of the cylinder bores 15 through 19 and 21 and are connected to a crankshaft (not shown) in a known manner as by means including connecting rods.

A cylinder head, indicated generally by the reference numeral 23, is affixed in a known manner to the cylinder bank 13. In a like manner, a cylinder head, indicated generally by the reference numeral 24, is affixed to the cylinder bank 14. Each cylinder head 23 and 24 has a recessed cavity 25 formed therein for each of the cylinder bores. The cavities 25, pistons 22 and cylinder bores 15 through 19 and 21 form the combustion chambers of the engine and the reference numerals 25 will be, at times, referred to as the combustion chambers.

The combustion chambers 25 are generally hemispherical in shape and each chamber is provided with pair of exhaust passages formed in the respective cylinder head 23 or 24 which extend from the chambers 25 and which are adapated to cooperate with respective exhaust manifolds 26 and 27. These exhaust passages are identified by the reference numeral 28 and are shown only in FIG. 2. Exhaust valves 29 are reciprocally supported in each of the cylinder heads 23 and 24 and control the communication of the cylinder head exhaust passages 28 with the combustion chambers 25. The exhaust valves 29 associated with each cylinder bore 15 through 19 and 21 are operated in unison in a suitable manner as by means of an overhead mounted camshaft (not shown).

On the opposite sides of the hemisphere from the exhaust valves 29, the cylinder heads 23 and 24 are provided with a pair of intake passages 31 and 32 for each chamber 25. The passages 31 terminate at an intake valve 33 while the passages 32 terminate at an intake valve 34. The portion of the passages 31 and 32 which extend through the respective cylinder heads 23 and 24 are substantially identical in construction and they each terminate in a generally horizontally extending surface 35 of the respective cylinder head.

The intake valves 33 and 34 are, like the exhaust valves 29, operated by means of respective overhead mounted camshafts 36, each supported for rotation in the respective cylinder head 23 or 24 in a known manner. The intake camshafts 36 have lobes 37 that cooperate with thimble tappets 38 so as to operate the valves 33 and 34 in a known manner. Coil compression springs 39 are provided for urging the valves 33 and 34 toward their closed positions.

Figure 4:
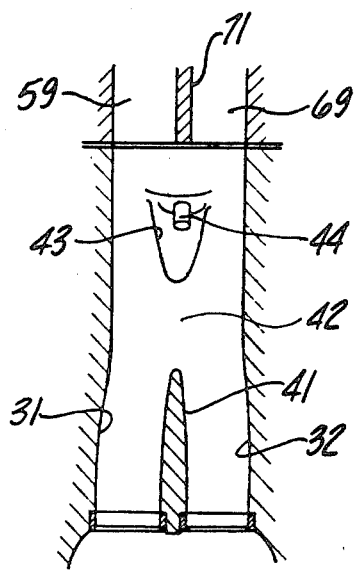
FIG. 4 is an enlarged cross-sectional view taken along the line 4—4 of FIG. 2.

As may be readily seen from FIG. 4, the cylinder head intake passages 31 and 32 are separated from each other by a boundary wall 41 that extends from the valve seats and for a portion of the length of the passages 31 and 32. However, this wall terminates short of the cylinder head face 35 so as to provide an open area 42 of limited length through which the passages 31 and 32 may communicate with each other, for a reason to be disclosed. In this communicating area 42, each cylinder head is provided with a recess 43 into which a fuel injection nozzle 44 extends. The nozzles 44 discharge in the downstream direction and because of their central placement, there will be good fuel distribution balance between the intake passages 31 and 32.

The induction system for the engine 11 further includes a first air box 45 that is juxtaposed to and positioned above the cylinder head 23 of the cylinder bank 13. A second, generally similar air box 46 is disposed adjacent and immediately above the cylinder head 24 of the cylinder bank 14. The air boxes 45 and 46 have inlet openings 47 at their forward ends which receive atmospheric air from an intake device, indicated generally by the reference numeral 48 and which has a generally Y shape in top plan. The intake device 48 has a common throat portion 49 from which branches 51 and 52 extend to the respective air boxes 45 and 46. A manually operated throttle valve 53 is supported in the throat 49 and is connected by a suitable linkage to the operator control for controlling the air flow into the induction system. A suitable air cleaner (not shown) may be positioned upstream of the throat device 49 for filtering the intake air and for achieving such silencing as may be desired.

In the illustrated embodiment, each air box 45 and 46 is divided by a generally horizontally extending wall member 54 into an upper plenum chamber portion 55 and a lower plenum chamber portion 56. It should be noted that even though there exists the wall 54, the plenum chamber portions 55 and 56 communicate generally freely with each other. If desired, the wall 54 may be deleted entirely.

The lower chambers 56 of each air box 45 and 46 are provided with respective outlet openings 57, there being one such opening 57 for each cylinder of each bank of the engine. The openings 57 communicate with elongated conduits 58 which have internal passages 59 and which extend from each opening 57 to an induction passage 31 of the opposing cylinder bank. That is, the air box 45 serves the intake passages 31 of the cylinder head 24 while the air box 46 serves the intake passages 31 of the cylinder head 23. As a result, a relatively long air flow path is provided which gives the opportunity to insure laminar flow through the induction system so that the passages consisting of the air box chamber 56, passages 59 and cylinder head intake passages 31 may be tuned so as to give good running characteristics at low and mid-range running.

Each air box plenum chamber 55 is also provided with a plurality of outlet openings 61, there being one such opening for each cylinder of the engine. The openings 61 communicate with respective valve bodies, indicated generally by the reference numeral 62, which are affixed in a suitable manner to the air boxes 45 and 46. The valve bodies 62 have a number of passages 63 that are equal in number to the openings 61 and which directly communicate with these openings. Throttle valves of the butterfly type 64 are supported in each of the valve body openings 63 on a common throttle valve shaft 65. In this way, the throttle valves 64 associated with each air box 45 and 46 will be operated in unison.

At one end of the engine 11, the throttle valve shaft 65 associated with the air box 45 is extended and is connected by means of a linkage system 66 to a vacuum motor 67. The vacuum motor senses induction system vacuum downstream of the throttle valve 64. The construction and operation of the vacuum motor 67 is such that the throttle valves 65 will be held in their closed position until induction system pressure increases (manifold vacuum decreases) so as to indicate that the engine has approached its maximum power output or power demand condition. Then the valves 64 will be opened.

The throttle valve shaft 65 of the valve body 62 associated with the air box 46 extends from the other end of the engine and is also connected to a vacuum actuator 67 by means of a linkage system 66 so as to be operated in the same manner as that associated with the air box 45.

The valve body induction passages 63 communicate with conducts 68 having induction passages 69 that each extend to the intake passages 32 of the adjacent cylinder head. Hence, the plenum chamber 55 of the air box 45 serves the intake passages 32 of the cylinder head 23 while the plenum chamber 65 of the air box 46 serves the intake passages 32 of the cylinder head 24. Hence, these intake passages can be kept very short to permit tuning for maximum power output.

It should be noted that the conduit passages 59 and 69 serving the intake passages 32 and 31, respectively, are separated from each other by respective walls 71. Hence, there is only a relatively short area of open communication (the area 42) between the respective conduits serving the cylinder head intake passages 31 and 32. This short but nevertheless open communication has been found to be extremely important in assuring good running during transition from mid-range to wide open performance. The importance of this arrangement is stressed in application Ser. No. 597,815 which has been referred to previously.

The operation of the induction system will now be described. During low speed running, the manually operated common throttle valve 53 will be operated under the operator's control and will be opened only to a small degree. There will be a relatively high induction system vacuum exerted on the vacuum motors 67 so as to hold the throttle valves 64 in their closed positions. Hence, substantially all of the induction air for the engine will be supplied through the inlet device 48 to the air boxes 45 and 46 and specifically to their outlets 57. This air is transferred from the air box 45 through the relatively long conduits 58 and passages 59 to the induction passages 31 of the cylinder head 24. In a like manner, the plenum chamber 56 of the air box 46 will serve the induction passages 31 of the cylinder head 23. Hence, as has already been noted, a relatively long air path is provided that will insure laminar flow. However, the air flow will flow through a relatively small cross-sectional area of the total induction system area serving each cylinder bore 15 through 19 and 21 so that the inducton will be at a high velocity. This will insure a rapid rate of flame propagation in the chambers which insures that there will be good combustion.

As the load on the engine increases and the manually operated throttle valve 53 is progressively opened, there will be a good point when the passges 31 cannot supply the full charge requirements of the combustion chambers 25. This occurs at a point before that at which the throttle valves 64 are opened. At this point, induction charge may flow through the communicating area 42 to enter the chambers 25 through both the induction passages 31 and 32 and intake valves 33 and 34 of the cylinder head. As has been previously noted, this communication provides significantly improved mid-range performance since it eliminates or substantially reduces the dip which would otherwise occur in the torque curve of the engine at this point.

As the load continues to increase, and the throttle valve 53 is progressively opened, the induction system vacuum will eventually reach a point where the vacuum motor 67 no longer holds the control valves 64 in their closed positon and these valves will open. Thus, the effective area of the induction system serving each cylinder bore 15 through 19 and 21 will substantially increase and a very good maximum output can be achieved. Furthermore, as has been noted, the passages 69 which serve the intake ports 32 are relatively short and will offer low flow resistance and may be tuned so as to achieve the desired flow under this running condition.

Figure 2:
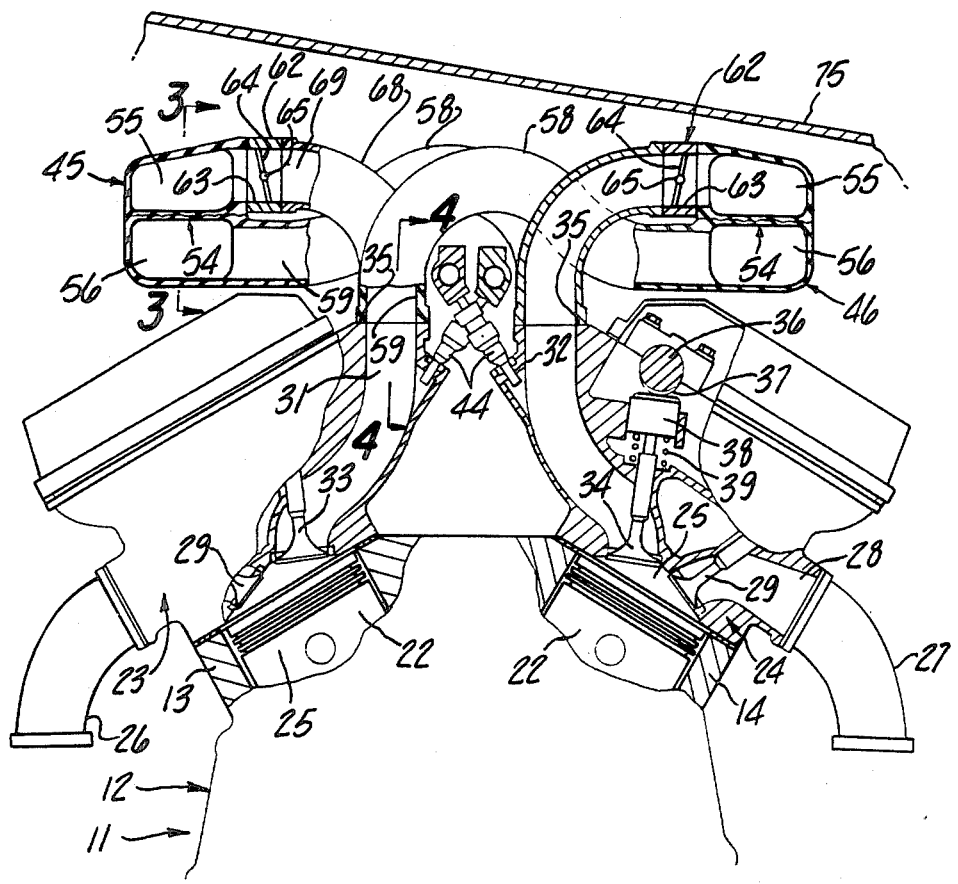
FIG. 2 is a front elevational view, with portions shown in section, taken generally along the line 2—2 in FIG. 1.
Figure 3:
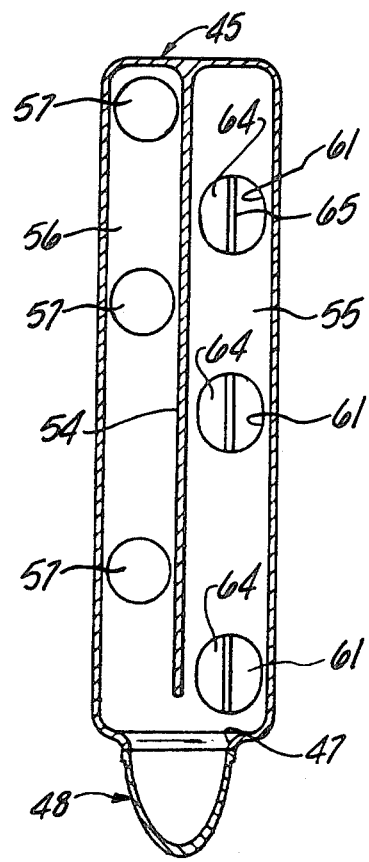
FIG. 3 is an enlarged cross-sectional view taken along the line 3—3 of FIG. 2.

It should be readily apparent that the described construction permits good induction efficiency and cylinder charging under all running conditions. In addition, the use of the two air boxes 45 and 46 provide a large volume which insures good distribution and reduces induction system noise. By employing the two spaced apart air boxes, it is possible to obtain a relatively low hood line, as indicated in FIG. 2, wherein the hood is partially shown and is identified generally by the reference numeral 75. This is possible even if the engine 11 is disposed transversely in the associated vehicle. Furthermore, the configuration permits the use of separately tuned induction passages for each cylinder in a compact area.

Although an embodiment of the invention has been illustrated and described, various changes and modifications may be made, without departing from the spirit and scope of the invention, as defined by the appended claims.

We claim:

1. An induction system for an internal combustion engine having a first cylinder, a second cylinder spaced from said first cylinder, first and second intake ports serving each of said cylinders, a first air box lying substantially directly above said first cylinder and spaced from said second cylinder, a second air box lying substantially directly above said second cylinder and spaced from said first cylinder and said first air box, a first conduit extending from said first air box to the first intake port of said first cylinder, a second conduit extending from said second air box to said first intake port of said second cylinder, a third conduit extending from said first air box to the second intake port of said first cylinder, and a fourth conduit extending from said second air box to the second intake port of said second cylinder, two of said conduits having a substantially greater effective length than the other of said conduits.

2. An induction system as set forth in claim 1 wherein the cylinders are disposed at an angle to each other.

3. An induction for an internal combustion engine having a cylinder bore closed by a cylinder head, said cylinder head having first and second intake passages serving said cylinder bore, a first air box juxtaposed to and lying substantially directly above said cylinder head, a second air box not overlying said cylinder head and spaced further from said cylinder head than said first air box, a first intake conduit extending from said first air box to said first intake passage of said cylinder head, and a second intake conduit extending from said second air box to said second intake passage of said cylinder head, said intake conduits having substantially different effective lengths.

4. An induction system as set forth in claim 3 further including throttle valve means disposed in only one of the intake conduits extending to the cylinder head.

5. An induction system as set forth in claim 4 further including manually operated throttle valve means for controlling the flow through all of the cylinder head intake passages.

6. An induction system as set forth in claim 4 wherein there is a single manually operated throttle valve.

7. An induction system as set forth in claim 6 further including a common air inlet device for supplying atmospheric air to both of the air boxes, the single manually operated throttle valve being positioned in said air inlet device.

8. An induction system as set forth in claim 3 further including means communicating the cylinder head intake passages with each other over a relatively short effective area.

9. An induction system as set forth in claim 8 further including charge forming means for delivering fuel to the intake passages in the communicating area.

10. An induction system as set forth in claim 9 wherein the charge forming device comprises a fuel injection nozzle.

* * * * *